UNITED STATES PATENT OFFICE 2,678,281

OPTICAL GLASS

Walter Geffcken and Gerd Rehs, Landshut (Bay.), Germany, assignors to Jenaer Glaswerk Schott & Gen., Mainz, Rheinland-Pfalz, Germany No Drawing. Application May 6, 1953,
Serial No. 353,436

Claims priority, application Germany
May 26, 1952

5 Claims. (Cl. 106—53)

Optical glasses so far known, with a refractive index $n_d$ greater than 1.70 and a value of the Abbe number $v$ of between 42 and 52 either contain considerable amounts of the expensive tantalum, poisonous beryllium, or radioactive thorium, or show an inclination to crystallize, as do glasses with a high content of cadmium oxide (CdO), or else are strongly colored, as for instance glasses with a high percentage of tungsten oxide ($WO_3$). By the present invention it becomes possible to produce, without employing any of the substances named, colorless and not too expensive glasses of the desired optical characteristics and which are free from any tendency to crystallize. This is accomplished by using a composition of 25% to 38% of lanthanum oxide ($La_2O_3$), 4% to 18% lead oxide (PbO), 30% to 48% boron trioxide ($B_2O_3$), and at the most 6% silicium dioxide ($SiO_2$), while the content of calcium oxide (CaO), strontium oxide (SrO), barium oxide (BaO), and zinc oxide (ZnO) combined is at least 9% but does not exceed 30%.

Into these glasses, zirconium oxide ($ZrO_2$) can be introduced without difficulty in proportions of up to 8.5%, at a considerable increase in chemical stability.

Generally speaking, it is best to hold the content of the bivalent components named, CaO, SrO, BaO, ZnO together under 22%, because the melts will then be particularly free from tending to crystallize.

It is to be recommended not to let the baryta content rise above 5%, as otherwise a tendency toward crystallization is to be feared.

If refractive-index figures of about 1.715 and above are desired, the combined content of $La_2O_3$ and PbO should be held at over 37%.

The substitution of lanthanum oxide for an equal share of lead oxide but with the glass composition otherwise unaltered does not affect the $n_d$-value, but reduces the $v$-value by about 0.4 per 1 per cent of oxide replaced.

Because of the high fluidity of the glasses of the invention, they should preferably be melted in the platinum crucible.

Naturally, additional glass components such as alkali and alkali oxides, magnesium oxide (MgO), tantalum oxide ($TaO_5$) and others can be introduced in quantities of at the most 3% all told, without thereby affecting the nature of the invention.

The table below shows a number of examples of the glasses of the invention in respect to composition and optical character.

|        | 1     | 2     | 3     | 4     | 5     | 6     | 7     | 8     | 9     |
|--------|-------|-------|-------|-------|-------|-------|-------|-------|-------|
| $SiO_2$ | 5.9 | 2.0 |  | 4.0 |  |  | 4.0 | 4.0 | 4.0 |
| $B_2O_3$ | 37.6 | 36.0 | 37.6 | 37.3 | 42.0 | 41.3 | 32.7 | 32.7 | 32.7 |
| $La_2O_3$ | 33.7 | 25.0 | 26.7 | 25.7 | 26.4 | 32.4 | 38.0 | 26.8 | 29.0 |
| $ZrO_2$ | 7.9 | 3.0 | 2.5 | 7.4 | 7.8 | 8.1 | 7.5 | 7.5 | 7.5 |
| PbO | 4.0 | 4.0 | 11.3 | 10.7 | 12.1 | 6.1 | 6.8 | 18.0 | 15.8 |
| CaO | 10.9 | 5.0 | 14.5 | 10.9 | 11.7 | 12.1 | 11.0 | 11.0 | 11.0 |
| SrO |  | 3.0 |  |  |  |  |  |  |  |
| BaO |  | 5.0 |  |  |  |  |  |  |  |
| ZnO |  | 17.0 | 7.4 | 4.0 |  |  |  |  |  |
| $n_d$ | 1.705 | 1.710 | 1.717 | 1.717 | 1.717 | 1.720 | 1.738 | 1.744 | 1.744 |
| $v$ | 52.0 | 50.0 | 47.8 | 47.9 | 48.0 | 50.3 | 48.5 | 43.7 | 44.7 |

We claim:

1. Optical glass of a refractive index $n_d$ greater than 1.70 and a $v$-value between 42 and 52 being free from tantalum oxide, thorium oxide and beryllium oxide and containing from 25% to 38% $La_2O_3$, 4% to 18% PbO, 30% to 48% $B_2O_3$, at the most 6% $SiO_2$, and 9% to 30% of CaO plus SrO plus BaO plus ZnO.

2. Optical glass according to claim 1 containing up to 8.5 of $ZrO_2$.

3. Optical glass according to claim 1, containing CaO plus SrO plus BaO plus ZnO to an amount of less than 22%.

4. Optical glass according to claim 1 containing BaO to an amount of not over 5%.

5. Optical glass according to claim 1 containing $La_2O_3$ plus PbO to an amount of over 37%.

No references cited.